July 20, 1965  G. M. HUNT  3,196,448
MACHINE FOR MAKING A CODED RECORD FROM A COMPOSITE BUSINESS FORM
Filed Aug. 7, 1962  5 Sheets-Sheet 1
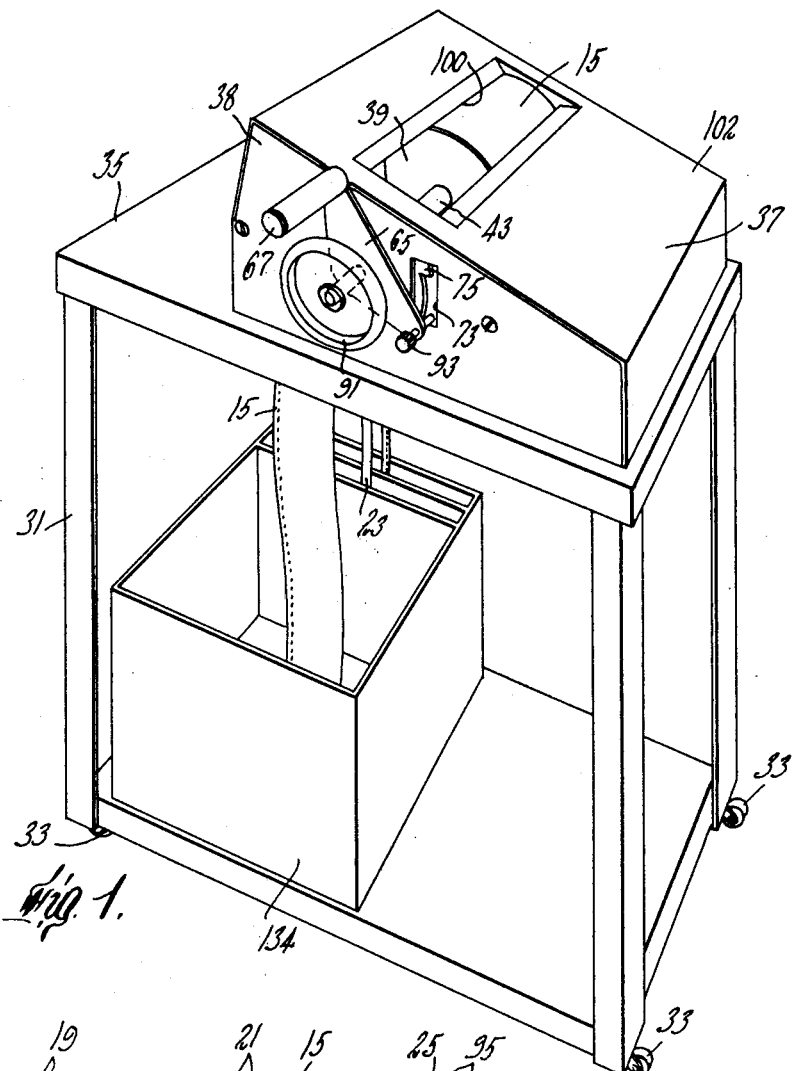
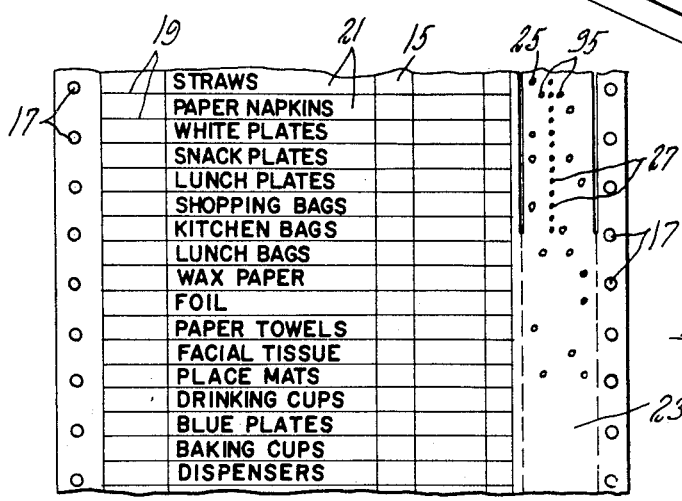

July 20, 1965

G. M. HUNT 3,196,448

MACHINE FOR MAKING A CODED RECORD FROM A COMPOSITE BUSINESS FORM

Filed Aug. 7, 1962

July 20, 1965 G. M. HUNT 3,196,448
MACHINE FOR MAKING A CODED RECORD FROM A COMPOSITE BUSINESS FORM
Filed Aug. 7, 1962 5 Sheets-Sheet 4

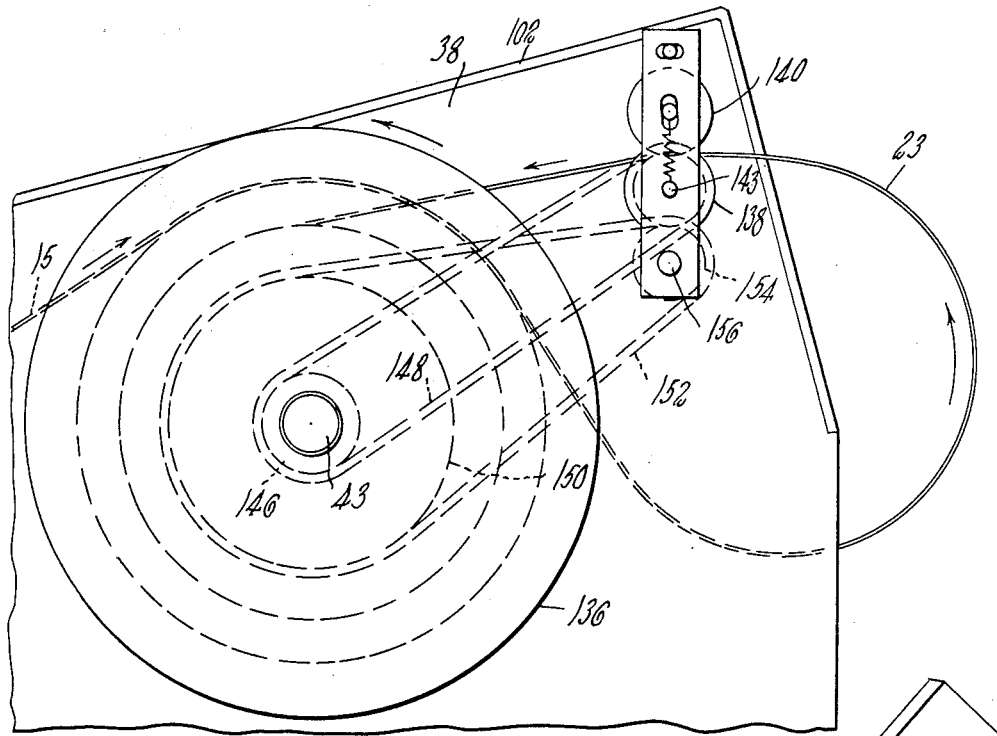
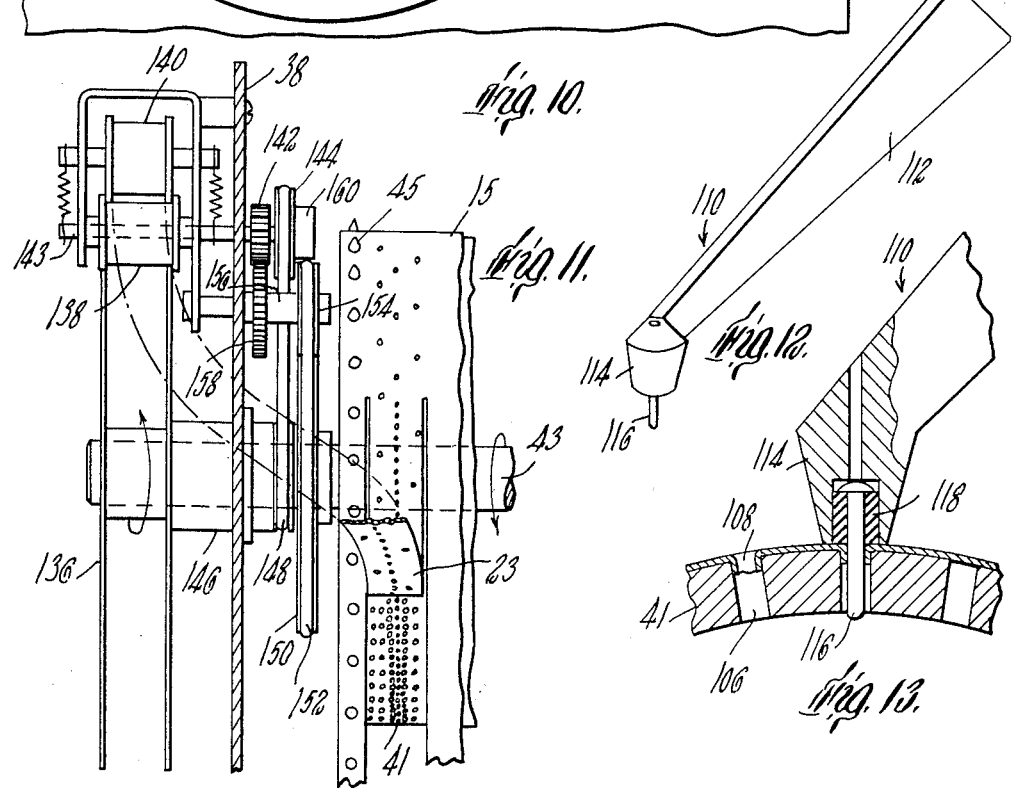

United States Patent Office 3,196,448
Patented July 20, 1965

3,196,448
MACHINE FOR MAKING A CODED RECORD FROM A COMPOSITE BUSINESS FORM
Guilbert M. Hunt, Willowick, Ohio, assignor to Bonnar-Vawter Incorporated, Keene, N.H., a corporation of Delaware
Filed Aug. 7, 1962, Ser. No. 215,361
5 Claims. (Cl. 346—24)

This invention relates to business record forms and to machines and methods for recording information thereon. More particularly it relates to a composite record form which includes both a visually legible and comprehensible first record portion and an associated machine-readable or coded second record portion and to a manner and apparatus whereby the coded part of the record may be produced on the form and separated therefrom so that the two portions of the record may be used independently of one another, the second record portion by itself preferably being a coded tape of a type used in automatic telegraphy equipment or other machines.

In inventory work, accounting applications, payroll listing and many other business record situations it is customary for standard or master lists of information items to be used, against or opposite which associated numerical units or other secondary items are entered or compared. When transmitting or using such records it is uneconomical always to repeat the standard master information because this is known, and only the secondary associated items are of immediate significance. Therefore, it may be planned to transmit or use only the associated items of the complete record. However, because in some instances there may be no entry in a particular secondary item, in such cases provision must be made to keep this associated record in phase or synchronization with the standard master list or record, to the end that the associated secondary record will be in correct positional association with items on the standard master record. One object of the present invention is to provide a business record form on which a standard master record and an associated secondary record may be entered, and means by which the desired synchronization of these records is maintained even though they may be separated and used independently of each other. The invention also provides a technique and machine for producing a secondary record with the same item positions and spacing as items on a standard master record related thereto.

The advent of automatic data processing machines has made available in many business establishments and offices automatic telegraphy equipment and business machines capable of producing and using coded tape of types regularly used in such telegraphic equipment. Therefore, according to a preferred embodiment of the invention a composite record form is provided in which the secondary record is a coded tape of a type used in automatic telegraphy equipment and other code-reading machines, and apparatus is provided by which such a coded tape record is produced in a novel way.

Many applications of business machines require that they be used in locations where electrical power is either lacking or inconvenient to supply. Another object of the invention therefore is to provide a coded record producing machine which is operated manually, without the use of electrical motors or the like requiring an external source of driving power. This makes the machine readily portable, which is an advantage and may be a requirement in many types of work.

An objection to many code record forms and code-producing machines is that they require a skilled or trained operator for successful use. A further object of the invention is to provide a coded record form and a code producing procedure and apparatus which may be used easily by someone with but little skill or having only a small amount of simple training.

The above and other objects are met according to this invention by providing a business record form in the shape of an elongated sheet of paper adapted for form-feeding throughout its length, with areas defined transversely on the sheet at regularly spaced intervals carrying transverse lines of a legible master record and an integral but detachable elongated code strip on the sheet alongside the transverse record lines, the strip having code record and strip feeding portions thereon in alignment with each of the transverse record lines, the elongated code strip, when detached from the elongated business form, constituting a coded telegraphic tape or machine-readable record positionally related to transverse lines of the legible master record on the original sheet. Also, and according to the machine aspect of this invention, equipment is provided for feeding the composite record sheet form and code tape with form feeding means which position the transverse lines of the form in definite locations above a working surface in the apparatus. Opposite these transverse lines the working surface is provided with a series of code producing holes in alignment with each of the transverse lines, and an operator pierces or punches holes through the code strip at selected locations through the code producing holes in the working surface, the equipment further being provided with a punch which automatically forms strip-feeding holes in alignment with the code holes as the form is fed through the machine, the machine further being provided with a means which detaches the coded strip from the rest of the sheet so that a coded tape with feed holes is an end product.

Other objects and further details of that which is believed to be novel and included in this invention will be clear from the following description and claims, taken with the accompanying drawings in which are illustrated examples of a composite business form with coded record tape and a machine for using the same to produce a coded tape, both the composite form and the machine embodying aspects of the present invention and incorporating features outlined above.

In the drawings:

FIG. 1 is a perspective view showing the front and top with one side of a coded record producing machine using a composite form according to the invention;

FIG. 2 is a front view or layout of a composite form with coded tape according to the invention, showing different portions in various stages or steps of production;

FIG. 10 is a side view in elevation of a machine according to the invention but showing the addition of an arrangement for receiving and storing a coded record on a tape storage reel;

FIG. 11 is a vertical sectional view through the tape storage mechanism of FIG. 10;

FIG. 12 is a perspective view of a preferred form of stylus used in puncturing or piercing holes in the coded record tape portion of a composite form, and FIG. 13 is an enlarged vertical sectional view of the end of the stylus of FIG. 12 showing its cooperation with the form feeding mechanism of the machine and a coded record tape strip being produced thereon.

*Composite form with coded record*

Figure 3:
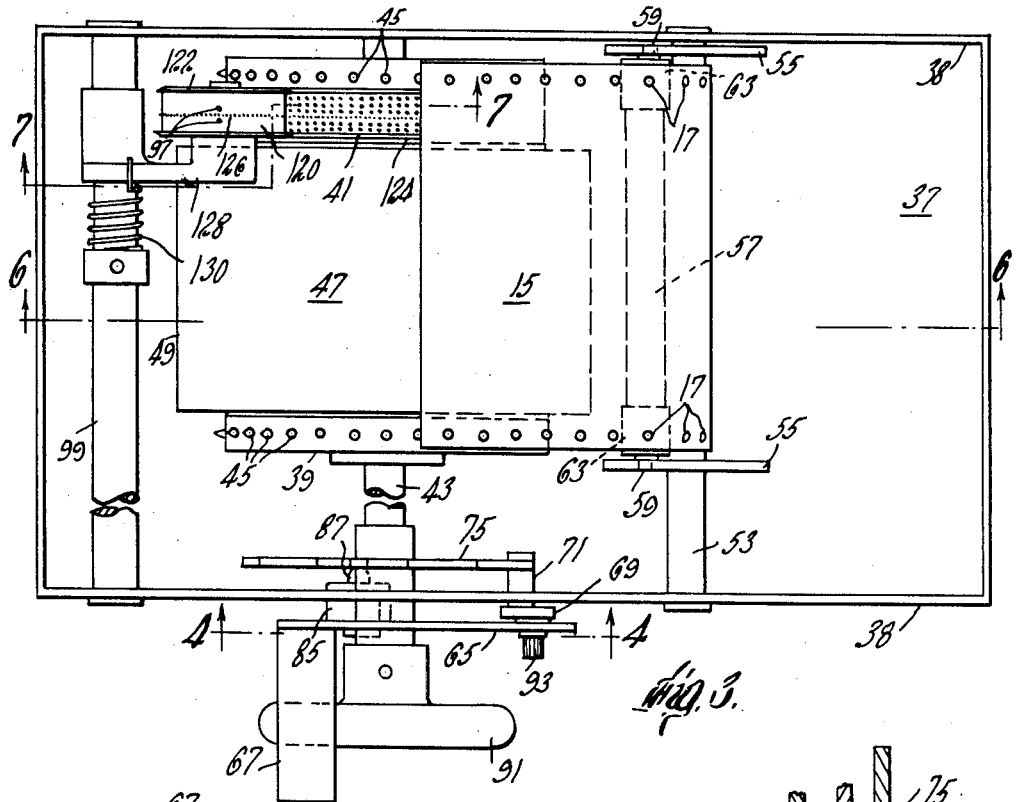
FIG. 3 is a top plan view of the machine of FIG. 1 with the cover removed.
Figure 4:
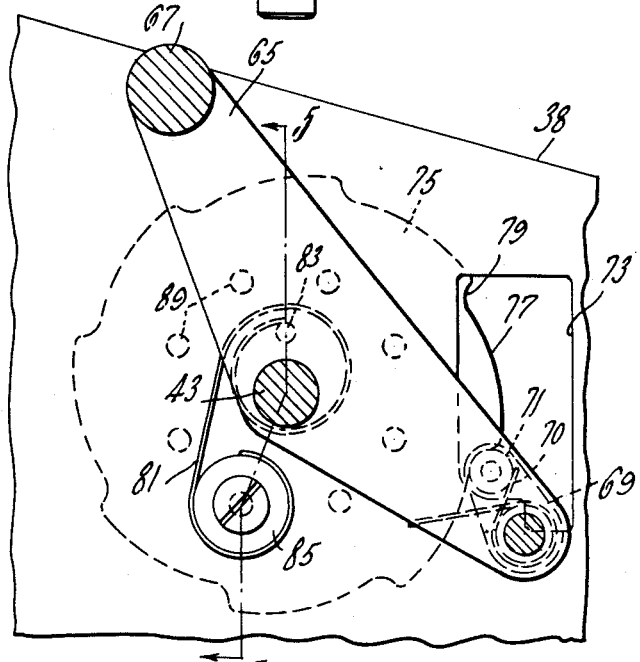
FIG. 4 is a vertical side sectional view on the line 4—4 of FIG. 3 showing some details of a mechanism for driving a composite form in the machine.
Figure 5:
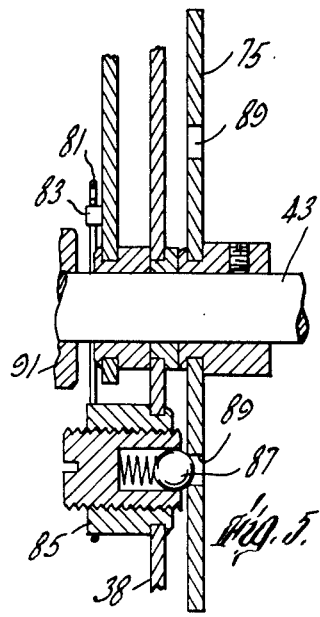
FIG. 5 is a sectional view on the line 5—5 of FIG. 4 showing further details of the drive mechanism.

In carrying out the objects of this invention, in one embodiment of a composite form incorporating preferred features thereof, an elongated sheet of paper 15 is provided with regularly spaced means such as the form feeding holes 17 which are customarily provided in many business forms in order to position and drive such forms through a register or other business machine. At regularly spaced intervals along the length of the form are provided transversely extending guide lines 19 defining between them transversely extending areas on which lines of legible information 21 may be placed. As an example of one manner of use of such a record it will be assumed that the lines of information 21 comprise a standard or master list of items found in a particular store or other establishment, this standard or master list being used from time to time to take inventory or to reorder stock. A typical spacing of the form feed holes will be on half-inch centers. Information lines 21 may be spaced five to the inch.

Extending adjacent all of the transverse information areas is an elongated strip portion 23, shown by dotted lines in FIG. 2. This strip is provided integrally with the form sheet 15, but is adapted to be separated therefrom and become a telegraphic or machine-readable tape carrying coded information related to the lines of information 21 on the first portion of the form. For this purpose every information line 21 has a corresponding transversely aligned area on the strip 23 adapted to receive a line of coded holes 25 and a strip feeding hole 27 in alignment with the code hole locations. Strip feeding holes may be provided ten to the inch. Thus, for every line of legible information 21 there is a corresponding line for receiving associated coded information 25 and a strip feed hole, with additional strip feed holes intermediate the code lines. When the coded information strip or record is separated from the legible record the original spacing and therefore the proper association of the related items is maintained by virtue of the equal spacing of items on both the legible record and the coded record. Because of the regular and equal recurrence of the form feed holes 17 with the transverse lines 19 and areas 21 and their matching relationship with the regularly spaced code hole lines 25 and strip feeding holes 27, the coded record bears a constant positional synchronization with the legible record even when these parts of the form are separated.

In the preferred embodiment of composite record sheet with coded tape the tape or strip portion 23 is coated or impregnated in advance with a stiffening material such as a lacquer or artificial resin which reinforces this strip area of the sheet and conditions it for easier punching and for better handling by subsequent tape processing machines or equipment such as tape readers, tabulators and the like. If desired, spots may be printed in the locations in which code holes can be pierced in alignment with the lines of legible information, and the location of strip feeding holes also may be printed in advance. In the form of the invention here shown, such location spots are not included because the reinforcing material on the code tape strip renders this portion of the composite sheet less opaque and somewhat translucent compared to the main portion of the sheet, holes in the working surface in the machine according to this invention showing up as darker shadow spots visible through the paper to guide an operator as will be clear from further description of the machine.

In place of or in addition to the printed code spots above referred to, each code line area 25 may be provided with a printed indication of the value of each code hole or position, for example the printed numbers 1, 2, 4, 8, and 16 for binary notation in a standard five-channel telegraphic tape code, or the designations 1, 2, 4 and 7 in a four-place number code according to another system. If desired, and in accordance with accepted practices in coded telegraph tapes, any number of channels or code places up to seven or eight or even more might be used, depending upon the purposes of the coded record and the uses to which it is put. In inventory and stock ordering applications a five-channel code such as the one illustrated will be found sufficient in many instances, being capable of indicating thirty-one separate numerical values or conditions in binary notation. Obviously any desired coding system might be used.

The code strip not only carries the coding lines and strip feed hole areas but also may be made readily detachable from the rest of the form as by parallel lines of slitting or scoring at each edge (not shown), sufficient material being left to hold the code strip in place on the composite from until after the coded record is produced. An advantage of the machine according to this invention is the fact that the strip need not be prepared in advance with these weakened sections for ready detachability, but the machine provides means for punching strip feed holes in alignment with the code holes and for simultaneously severing and separating the coded tape from the composite form.

In the discussion above it has been assumed that the coded information will be punched or pierced in the composite form and record, and this is preferred, but in a broad sense the invention is not limited to use of a punched code. Other types of machine-readable coding might be used, such as spots or areas of electrically conductive marking material, magnetic inks or paints, or simply areas of contrasting hue or color which may be read photoelectrically by machines of known character. However, a pierced or punctured hole coded tape is acceptable and is preferred because it is usable in the majority of machines utilizing such tapes at the present time.

*Method and machine for producing coded record*

An exemplary device according to this aspect of the invention includes a main machine-carrying frame 31 supported on casters 33 and having a horizontal supporting surface 35 arranged at a height above the floor convenient for manipulation of the machine proper 37. Between the side walls 38 of the machine, the principal active element is a rotary drum assembly, in reality a pair of form-feeding wheels 39 and 41 carried on a rotatable supporting shaft 43 to which the wheels are keyed, pinned or otherwise secured. Each of the wheel elements of the drum is provided around its periphery with a matched series of regularly spaced radially projecting form feeding pins 45 which cooperate with the form feeding holes 17 on the composite record sheet and feed the form across the arcuate face 47 of a working surface or viewing table 49 which is fixed in the machine between the form feeding wheels 39 and 41 as seen most clearly in FIG. 3. Part of the periphery of the wheel 41 also functions as an important component of the working surface or viewing table as will later appear.

Figure 6:
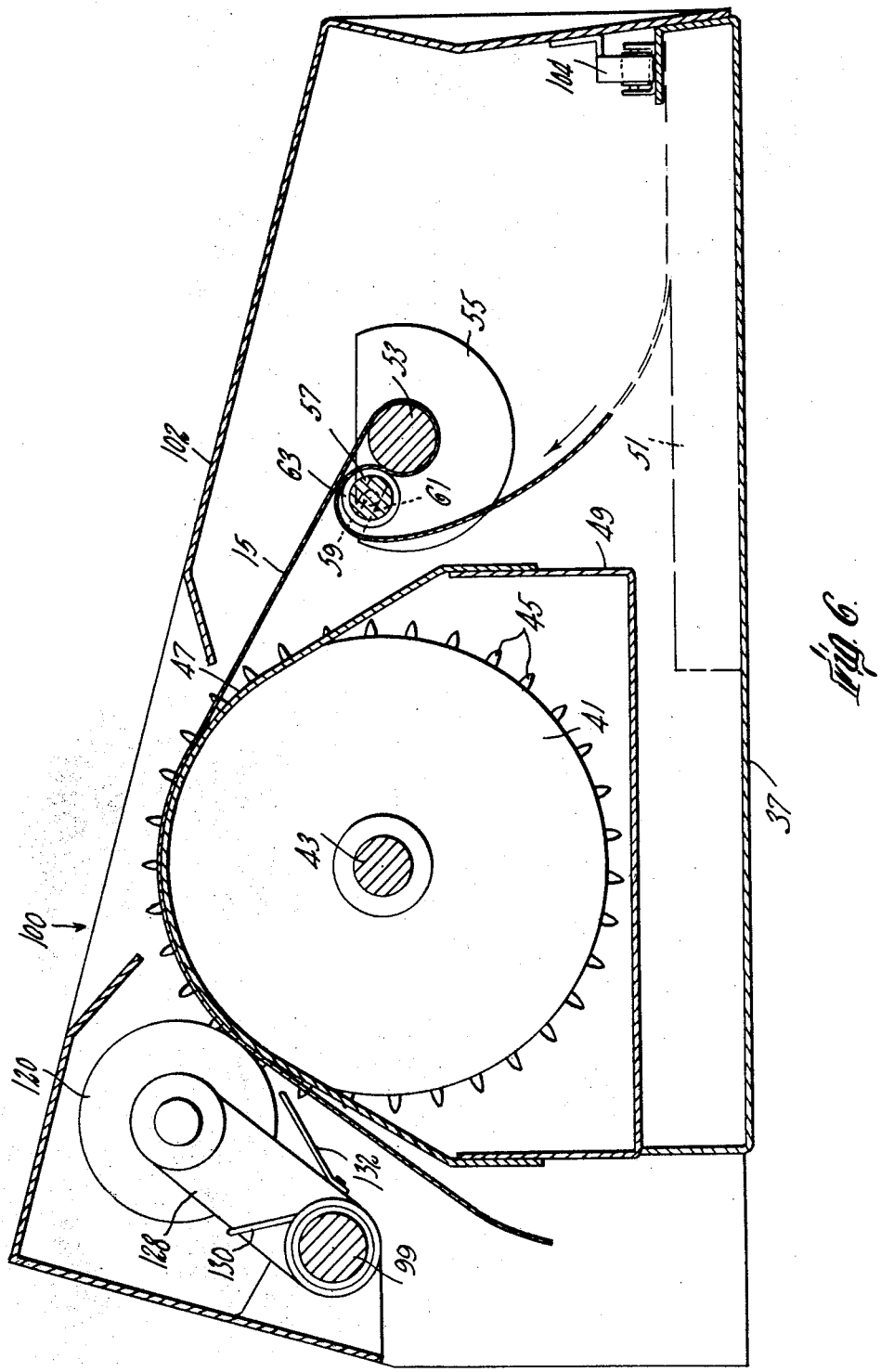
FIG. 6 is a longitudinal vertical section on the line 6—6 of the machine in FIG. 3.
Figure 7:
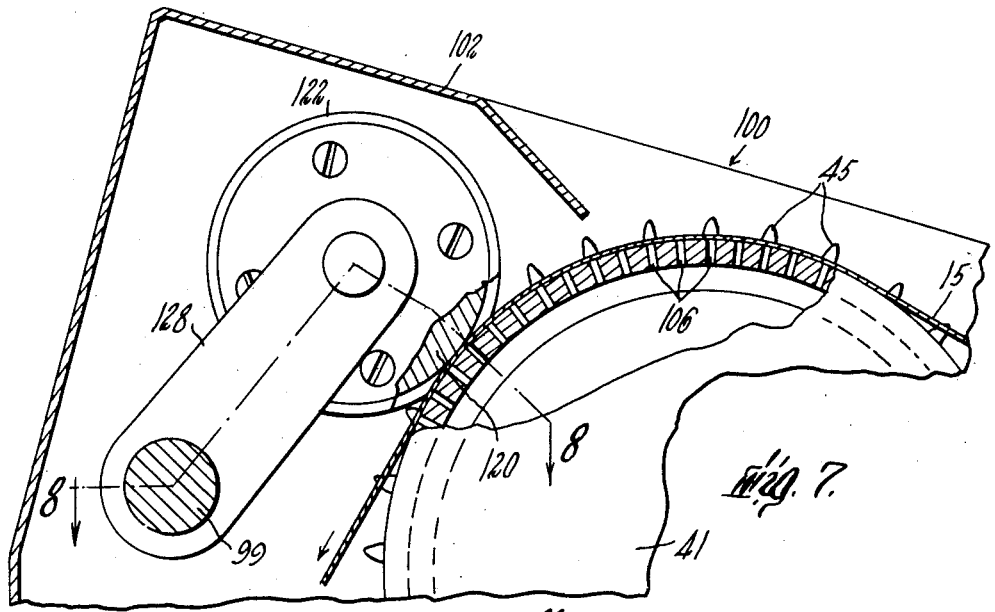
FIG. 7 is a vertical sectional view on the line 7—7 of FIG. 3 but on a larger scale.

In using the machine, a supply of the composite form 15 is stored in the bottom of the machine casing as in a pile 51 in which the elongated sheet is folded back and forth upon itself in a zigzag fashion. Above the supply pile 51 a form guiding and snubbing bar 53 is fixed in the machine, this bar carrying guiding flanges 55 between which the edges of the form will fit and be guided. In order to keep the proper tension on the form as it passes through the machine, a gravity tension roller 57 is provided. The form is arranged to be fed from the pile first in back, then up, over and down in front of roller 57, which has ends 59 slidably and rotatably supported in slanted slots 61 in the flanges 55. Friction rings 63 on the roller 57 near its ends will bear against the edges of the form as it passes downwardly between the front of the tension roller and back of the guiding bar 53. The form then goes under the guiding bar, upward and back over it to the arch 47 of viewing table 49 and the form feeding wheels 39 and 41, where the form feed holes 17 are engaged over the form feeding pins 45 so that the form lies smoothly against the working surface and viewing table as seen best in FIG. 6.

When once engaged with the feed pins, the composite form is fed when desired by rotation of the drum assembly, that is, by rotation of the wheels 39 and 41. This may be accomplished in step by step fashion through manual actuation of a lever 65, pivoted on shaft 43 outside the machine. At its upper end the lever is provided with a hand grip 67 and at its lower end with a pivoted toggle link 69 biased by spring 70 and carrying a detent pin 71 at its free end extending through a cutout opening 73 in a side wall 38 of the machine. The inner end of the pin 71 engages with the edge of a rack wheel 75 which is pinned, keyed or otherwise fixedly secured to the shaft 43. The rack wheel is provided with a series of identical long outwardly curved surfaces 77 alternating with an equal number of relatively sharp inwardly directed notches 79 in which the detent pin 71 will actively engage when moved in a counterclockwise direction, being pressed thereagainst by the spring 70 which biases the toggle link 69. Due to the proportions and relative positions of the parts it will be seen that as the lever 65 is turned by hand grip 67 in clockwise direction, or pulled toward the operator, the detent pin will ride from one notch over one of the long curved surfaces 77 until it reaches the next notch 79, at which time the spring 70 will force the detent pin 71 into the notch. Thereafter, when the hand grip is released, the lever swings counterclockwise to its starting position under force of a lever return spring 81 which extends between an anchor post 83 on the lever and a bushing 85 fixed in the side wall 38, this return spring biasing the lever at all times in a counterclockwise or return direction. The detent pin, being engaged in a notch in the rack wheel, is forced by the return spring to drive the rack wheel, the supporting shaft and the form feeding wheels in counterclockwise direction to feed the form forwardly through one step, equal to about ten of the transverse lines 19 or 21 of the composite form in the example shown. The bushing 85 may also carry a spring pressed ball detent 87 which engages in one of a series of detent holes 89 in the rack wheel, to hold the drum assembly firmly in one of its detented positions until twisting of shaft 43 forces movement.

A single line feed, for moving the form forward in less than the multiple line spacing when desired, may be provided by a hand wheel 91 fixed to the shaft 43 and used to turn the drum assembly counterclockwise in between detented position. To move the form backward, the detent toggle arm is first twisted clockwise by a knob 93 extending outwardly from the pivot of the toggle, thus disengaging the detent pin from its notch in the wheel 75. The hand wheel then may be turned clockwise to any desired position in the reverse of the normal form feeding direction. Release of the knob 93 allows the normal feeding and detenting action to be resumed. If desired, the handle wheel 91 may be so connected to shaft 43 as to feed the form forward or backward, in which case the lever 65 with its hand grip 67 may be eliminated.

As a paper record 15 is fed by the pins on wheels 39 and 41 it is held smoothly over the arched working surface 47 at the top of the machine, several lines of information 21 being visible at the same time through a view opening 100 in the cover 102 of the machine. The machine cover may be suitably pivoted near the rear of the machine to be raised above the working parts when positioning or changing the paper form in the machine or otherwise when exposing the interior. The front edge of the cover may be spring latched as at 104 to hold it in place when the machine is being operated.

It should be noted that the curving arch 47 of the working surface coincides with and is immediately alongside that part of the circumferential arc of the adjacent wheel 41 where both are exposed in the view opening 100. This part of the wheel 41 therefore functions as a component of the working surface or viewing table. Unlike wheel 39, which is wide enough only to carry feed pins and support a short expanse of the form on either side of the feed pins, the circumference of wheel 41 is extended axially for a distance wide enough to span the coded strip area 23 of a form supported thereon. Not only this, but the cylindrical face of the wheel 41 is provided with rows of code position punching holes 106 and strip feeding position holes 107, all or alternate ones of which are aligned precisely with a row of the holes 106. The spacing between hole rows 106 is exactly the same as the spacing between the information lines 21 on the form and when a form is properly positioned on the drum assembly a row of holes 106 and 107 is always precisely aligned with a line 21 on the form, in back of the code strip area. Interengagement of the form feed holes 17 and the form feeding pins 45 establishes and maintains at all times a proper alignment of the holes 106 and lines 21. Therefore, when it is desired to enter machine-readable coded information on the code strip a line of code holes 106 and a feed hole 107 will be directly opposite an information line 21 of the standard list and be partially visible as dark shadow areas through the reinforced and less opaque material of the code strip. Alternatively, as pointed out above, guide spots might be printed on the form to help locate the code hole positions.

Assume that the operator of the machine has decided that a certain entry should be made on the code strip opposite a certain information line. Guided by knowledge of the code system, which can be learned with a minimum of training, or following numerical guides which may be printed at the code hole locations as explained above, the operator will punch or pierce the code strip to form punched code holes 25 therein, using a punch or stylus preferably like the stylus 110 shown in FIGS. 12 and 13. This stylus has a slender handle grip 112 with an angularly offset head 114, a rounded tip punching pin 116 being flexibly mounted in a cavity in the head as by a resilient annulus 118 of rubber surrounding the pin in the cavity. The diameter of the pin 116 is made sufficiently smaller than the diameter of the holes 106 in the drum wheel 41 that when the stylus is pushed against the paper at one of these holes the edges of the code holes produced in the strip are not cut but rather are broken and pushed aside as indicated at 108 in FIG. 13. This produces a "chadless" tape and disposition of chaff from the code holes is not a problem. Of course, where chaff is not objectionable, the stylus might be provided with a pin which punches to remove rather than pierce the code holes in the tape.

Figure 8:
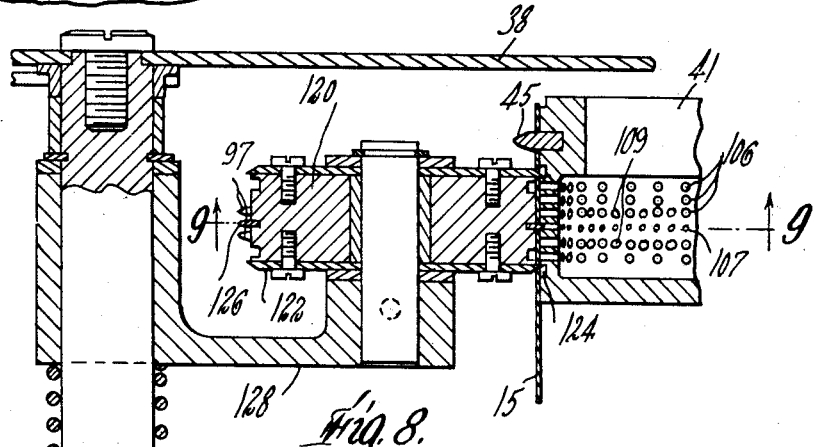
FIG. 8 is a section on line 8—8 of FIG. 7.
Figure 9:
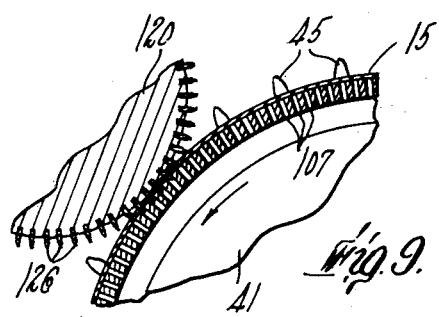
FIG. 9 is a section on line 9—9 of FIG. 8.

At this stage, the composite record and tape are still in one piece but the code holes carry the secondary coded information adjacent and in alignment with the standard legible list information on the main body of the form. As the machine is operated to bring a new set of lines opposite the view opening, the already coded portion advances beyond the view opening to a cutter and strip feed hole punching wheel 120 having circular cutting blades 122 at its sides which cooperate with the edges of grooves 124 on the wheel 41 (see FIG. 8) to cut or trim the code strip from the main body of the form. As this is happening, a series of strip feed hole punching pins 126 on the periphery of the wheel 120 between the blades 122 cooperate with the strip feed position holes 107 in the drum wheel 41, each of which or alternate ones of which are in alignment with rows of the code punching holes 106 and therefore aligned with the punched holes 25 in the record. This insures that the proper spacing and number of strip feeding holes will be produced in the tape so that it can be used in standard telegraphic apparatus.

To incorporate a means for detecting errors in a system using the tape of this invention, at certain of the strip feeding holes 27, pairs of error detection code-size test holes 95 may be provided, aligned one on either side of a feed hole 27. To prevent confusion with the item code holes 25 in the tape, the pairs of test holes 95 are always formed in alignment with a feed hole 27 which is between rows of code holes 25.

When test holes 95 are to be provided in the tape, the punching wheel 120 is equipped with two extra punching pins 97 these always cooperating with added pairs of punching holes 109 in the wheel 41 in transverse alignment with strip feed position holes 107 between the transverse rows of code position punching holes 106. Because the circumference of wheel 41 is not an exact integral multiple of the circumference of wheel 120, holes 109 must be provided alongside every alternate feed position hole 107 in order to cooperate properly with the single pair of punching pins 97 on wheel 120.

In an error detection system using the test holes 95, the tape reader will be set to count and will test the strip produced signal at intervals which should coincide with each pair of test holes, in the present example at intervals of every seven inches because of the circumference of wheel 120. If for any reason the tape reader does not sense these two holes 95, and only these two holes, at the proper interval (seven inches in the example), then it indicates an error by stopping automatically, with or without some other signal. The error might be at the sending or receiving end of the system but it may be localized easily by checking the system or examining the coded record only back to the last previous test point or interval which was successfully passed through the system.

The cutting and punching wheel 120 is rotatably mounted on a pivoted pressure arm 128 which may be rotatably supported on the back shaft 99 and spring pressed as by a spring 130 in a direction such that the wheel 120 is always urged toward the drum wheel 41. Engagement of the punching pins 126 in holes 107 drives wheel 120 as wheel 41 is rotated. Once in each revolution of wheel 120, pins 97 engage in a pair of holes 109 in wheel 41, to punch a pair of test holes 95. After leaving the cutter wheel, the coded tape may be stripped therefrom by a resilient arm 132 (FIG. 6) under the cutting wheel and passed through appropriate openings in the bottom of the machine and in the supporting surface 35 to a compartment in a box or bin 134 underneath, as seen in FIG. 1. The main part of the original form carrying the legible master record may be similarly led to another compartment in the bin 134 as may the narrow waste strip from the other edge of the form, carrying only form feeding holes.

This arrangement, although inexpensive and relatively convenient, has the defect that the coded tape strip may become tangled and be difficult to use or process thereafter. Therefore, it is preferred that a tape winding or reel takeup device be used to accommodate the punched tape as it is produced. This addition to the equipment is illustrated in FIGS. 10 and 11 of the drawings and consists of a driven mounting for a standard tape reel 136. As shown, when the cut coded tape leaves the machine with this arrangement it is not passed through the bottom of the machine but rather out through the back of the machine as seen in FIG. 10, being looped around and brought forward alongside the machine between a guiding and driving roller 138 and a cooperating spring mounted floating roller 140. The roller 138 is driven through a spur gear 142 fixed to the same shaft 143 as the roller, this shaft further carrying a pulley 144 connected to a hub 146 by a belt 148. The hub 146 is rotatably mounted on the main supporting shaft 43 on suitable bearings so that this shaft and the hub may rotate in opposite directions at the same time. The hub also carries at its outer end, in a conventional removable fashion, the tape windup reel 136.

As the main shaft 43 is rotated to feed the record form, a belt wheel 150 fixed on the shaft moves a driving belt 152 to rotate a pulley 154 which is on an intermediate drive shaft 156, suitably journalled on a side wall of the machine casing. This intermediate drive shaft also carries a gear 158 in mesh with the spur gear 142 so that as the pulley 154 is rotated gear 158 will correspondingly rotate spur gear 142 and turn the roller 138. Additional driving connection may be made between the rotatable supporting shaft 43 and the tape driving roller 138 by providing a cylindrical end 160 on the shaft 143 carrying the drive roller 138 and positioning the pulley 145 so that the outer surface of the driving belt 152 bears against the cylindrical surface 160 to drive it. Sufficient slippage is introduced by the belt friction drives so that a proper amount of take-up of the tape on the reel may be obtained at all times.

Reviewing one use of the form and machine above described, the elongated sheet 15 is provided with a standard or master typed list of stock items in a particular sequence, these items being the lines of regularly spaced legible information 21. The manager of a store or a stock clerk is to use this item list to produce a coded tape which then becomes an inventory report or a stock replenishment order which is further used to telegraph a message to a central office or a warehouse for recording or fulfillment. The central office or warehouse already has a standard or master list of all the stock items in the same sequence so this information need not be sent, and only the numerical inventory, reorder quantity or control information for each item will be telegraphed or used.

Carrying the form with the prepared master list on it, the operator moves around the establishment in a regular path which brings various items within his observation in the same order in which they appear on the standard list. After observing or deciding on the number, quantity or other information which should apply to an item on the list for the purpose at hand, he enters an appropriate coded record group on the strip portion 23 of the form immediately alongside the item to which it relates. With the exemplary form, the code group entry is made by punching or piercing the strip with one or more holes 25 at locations determined by the particular code being used. Absence of code holes would indicate no entry, but the presence of a strip feed hole at that transverse line on the form would show that a space or null value applied to that item on the standard list. Of course, if desired or preferred, definite codes could be provided to indicate "zero" or "no entry," or to designate such things as "no change," "order standard quantity," "cancel" or similar information of non-numerical significance.

The coding is done always in the same transverse line in which a strip feed hole will be located, which is on the same line as one of the legible lines of the standard list to which the code relates. Therefore, and because the tape will be used thereafter by machines, it is best to provide the strip feeding holes by mechanisms such as the pins 126 on wheel 120 and cooperating holes 107 on wheel 41 which insure the precise regularity required for machine handling. Note that this is done just after code entry, before there is a chance of slipping or misalignment of the form. At the same time, and to insure proper lateral alignment of the feed holes and code record groups on the tape, the coded strip area is separated from the rest of the elongated sheet as by the cutter wheel 120 in the machine shown. The finished coded tape is then ready for use by an automatic telegraph or other tape handling machine for its intended purpose.

As will be evident from the foregoing description, certain aspects of this invention are not limited to the particular details set forth and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. A machine for entering a coded record alongside transverse lines of information on an elongated business form and for separating the coded record from the rest of the form to produce an elongated code strip comprising a working table providing a viewing surface, means for advancing a said elongated form across said working table for viewing successive sections of said form, code forming means on said table for entering a coded record on the elongated form in transverse alignment with lines of information on the form and means, driven and cooperating with said form advancing means, for separating a strip carrying the coded record from the rest of the form said means for separating said strip also constituting means for providing strip feeding formations in the coded record strip simultaneously with separation of said strip as the elongated form is advanced.

2. For entering a punch-coded record alongside transverse lines of information on an elongated business form and for thereafter separating the coded record from the rest of the form to produce an elongated punched code strip, a machine comprising a curved working table providing a viewing surface, including a wheel for advancing a said elongated form intermittently across said working table for viewing successive sections of said form, said wheel having code forming holes therein for entering a punch-coded record on the elongated form in transverse alignment with lines of information on the form and a cutter driven by said form advancing wheel for separating a strip carrying the coded record from the rest of the form said cutter, in cooperation with said form advancing wheel also constituting means for punching strip feeding holes in transverse alignment with coded record holes in the strip.

3. For entering a coded hole record alongside transverse lines of information on an elongated business form and for separating the coded record from the rest of the form to produce an elongated code strip, a machine comprising a curved working table providing a viewing surface, a pair of form feeding wheels at the sides of said table for advancing a said elongated form across said table for viewing successive sections of said form, one of said form feeding wheels having regularly spaced groups of code forming holes therein for cooperation with a stylus in piercing a coded hole record on the elongated form in transverse alignment with lines of information on the form and a strip cutter for separating and feeding a strip carrying the coded record from the rest of the form.

4. For entering a coded record alongside transverse lines of information on an elongated business form and for thereafter separating the coded record from the rest of the form to produce an elongated code strip, a machine comprising a working table providing a viewing surface thereon for a form, a form-feeding wheel engaging a form on said table, means for turning said wheel to move an elongated form across said table for exposing successive transverse lines of said form, said wheel having stylus-guiding and code-forming lines of holes therein for cooperation with a stylus in punching a coded record on the elongated form with each line of holes in transverse alignment with a line of information on the form, means for punching feeding holes in transverse alignment with lines of coded record holes in the form, and means for separating a strip carrying the coded record and feeding holes from the rest of the form.

5. For entering a coded record alongside regularly spaced transverse lines of information on an elongated business form and for thereafter separating the coded record from the rest of the form to produce an elongated code strip, a machine comprising a rotary drum assembly with means for advancing a said elongated form thereby intermittently across an area for exposing successive transverse lines of information on said form, said assembly having lines of stylus-guiding and code piercing holes therein for cooperation with a stylus in entering a coded hole record on the elongated form in transverse alignment with an exposed line of information on the form and a cutting wheel cooperating with said drum assembly for separating a strip carrying the coded hole record from the rest of the form and a strip feed punch cooperating with said drum assembly for punching strip feeding holes in the coded hole record strip in transverse alignment with the coded hole record.

References Cited by the Examiner

UNITED STATES PATENTS

| | | | |
|---|---|---|---|
| 590,763 | 9/97 | Hanston | 234—8 |
| 662,308 | 11/00 | Ruddick | 346—136 |
| 857,974 | 6/07 | Bancroft | 178—112 |
| 974,561 | 11/10 | Fessenden | 346—138 |
| 1,648,275 | 11/27 | Karling et al. | 346—66 |
| 1,969,332 | 8/34 | Smith et al. | 346—1 |
| 1,978,849 | 10/34 | Ulfeng et al. | 346—66 |
| 2,002,437 | 5/35 | Maul | 101—47 |
| 2,271,073 | 1/42 | Harris | 346—19 |
| 2,858,073 | 10/58 | Taube | 235—61.12 |
| 2,927,463 | 3/60 | Stubbs | 346—1 |
| 3,095,502 | 6/63 | Sikora | 235—61.12 |

LEO SMILOW, *Primary Examiner.*